Figure 1:
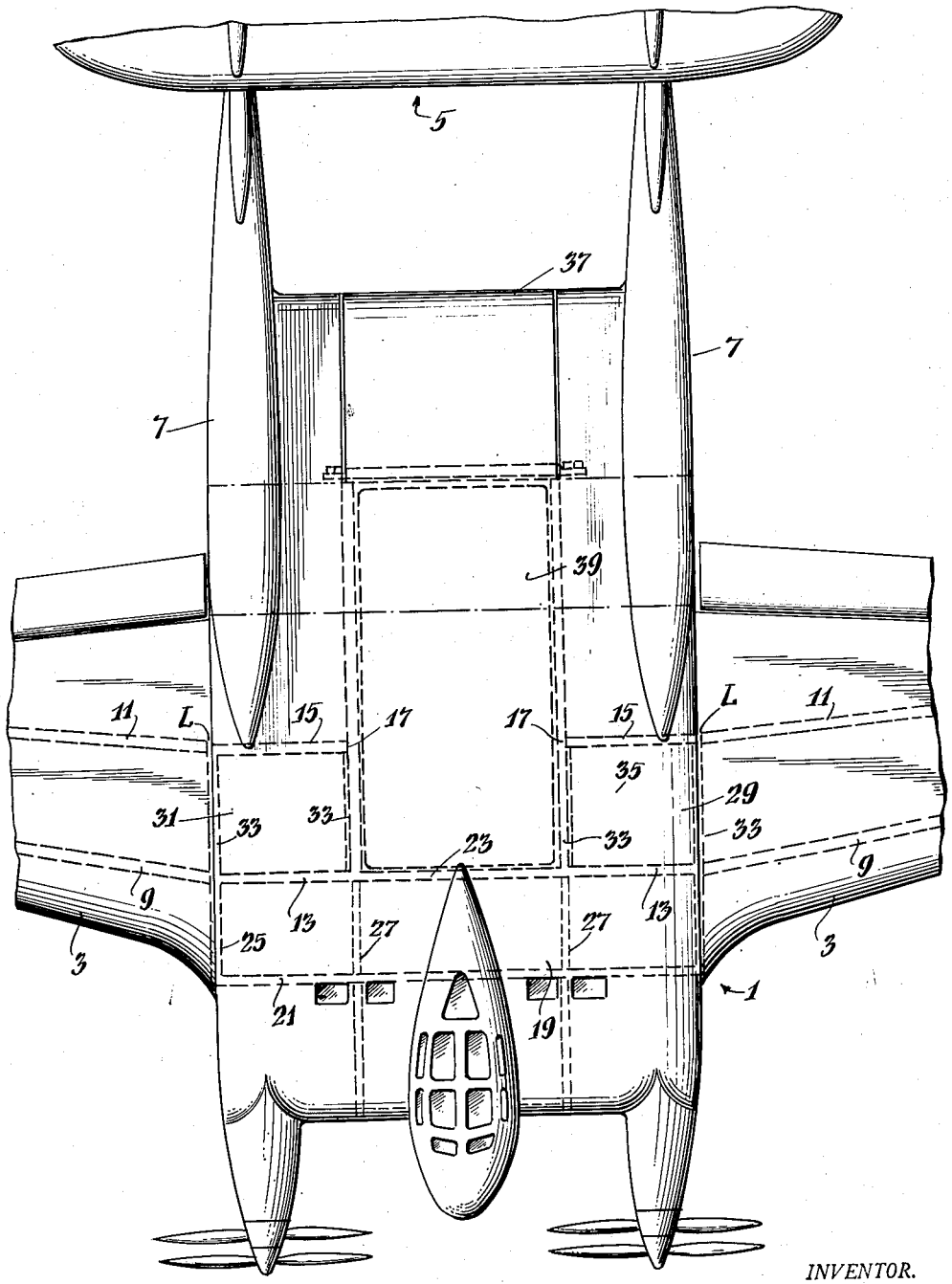

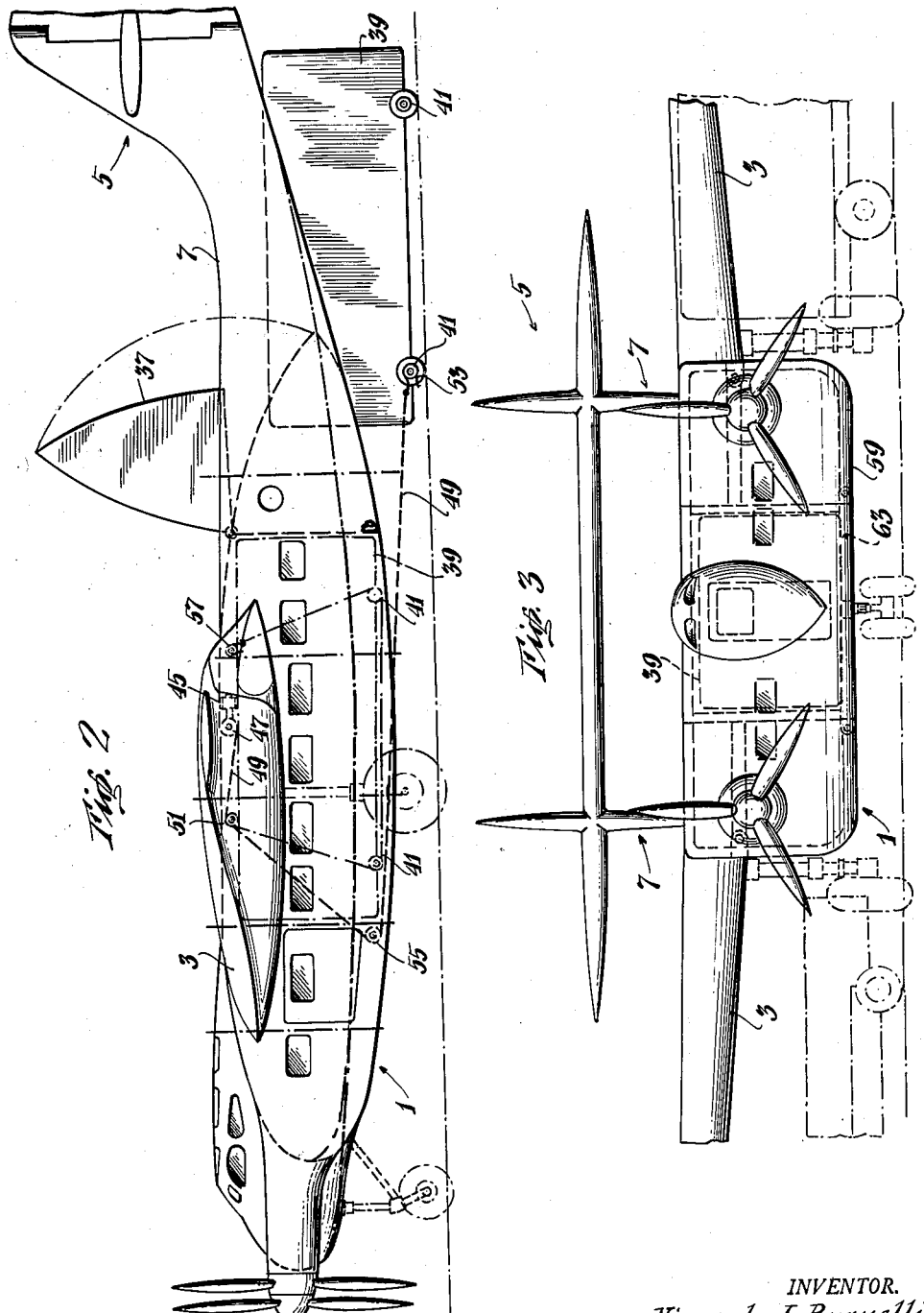

Patented Nov. 4, 1952

2,616,639

UNITED STATES PATENT OFFICE 2,616,639

CARGO AIR TRANSPORT

Vincent J. Burnelli, Englewood, N. J.

Application October 26, 1948, Serial No. 56,515

5 Claims. (Cl. 244—36)

This invention relates broadly to the art of cargo carrying airplanes, and in its more specific aspects it relates to a Burnelli lifting body type airplane developed and designed to carry wholly, or partly within the body section a relatively large cargo or freight container unit which is removably positioned therein; and the nature and objects of the invention will be readily recognized and understood by those skilled in the arts to which it relates in the light of the following explanation and detailed description of the accompanying drawings illustrating what I at present believe to be the preferred embodiments and mechanical expressions of my invention from among various other forms, arrangements, combinations and constructions of which the invention is capable within the spirit and scope thereof.

While this invention has been specifically developed in connection with airplanes of the Burnelli lifting body type, it is also applicable to certain other types of airplanes capable of being designed in accordance with this invention to transport relatively large cargo or other containers within the body section.

An airplane of the Burnelli type having a comparatively wide body section is developed in accordance with the present invention so as to be capable of receiving wholly within, or partly within the main or body section a relatively large container adapted to carry freight, the container being hoisted into the airfoil sectioned body by means carried within the body. The structure of the body is formed to accommodate the container without weakening the structural characteristics thereof since certain rearrangements of a novel character are provided for taking care of all the loads to which the airplane may be subjected.

It is therefore a fundamental object of this invention to provide an airplane having an airfoil sectioned body designed to removably receive therein a relatively large cargo container unit.

A further and equally important feature of this invention resides in the rearrangement of certain parts of the load carrying framework to provide clearances within the body portion for the cargo container unit.

Another object of this invention resides in the removal of certain of the conventional load carrying structure of the airplane and the addition of structure to which such loads are transmitted.

A further object of this invention is to so construct the airfoil sectioned body of an airplane that ample space is provided for receiving a relatively large cargo container while not reducing the ability of such body to withstand torsional and bending moments and other loads to which the airplane may be subjected.

It is also an object of this invention to so construct an airfoil sectioned body of an airplane that a relatively large cargo container may be disposed thereunder from the rear of the airplane.

With the foregoing general objects, features and results in view, as well as certain others which will be apparent from the following explanation, the invention consists in certain novel features in design, construction, mounting and combination of elements, as will be more fully and particularly referred to and specified hereinafter.

Fig. 1 of the drawings is a top plan view of an airplane of the Burnelli lifting body type with parts of the wings thereof broken away, and certain upper parts of the body not shown, and illustrating a cargo container mounted and positioned within the airfoil sectioned body.

Fig. 2 of the drawings is a view in side elevation of the airplane illustrated in Fig. 1 of the drawings and illustrating the cargo container in position rearwardly of the body prior to being drawn thereunder.

Fig. 3 of the drawings is a view in front elevation of the airplane of Figs. 1 and 2 of the drawings with the cargo container positioned and mounted in the airfoil sectioned body.

Referring to the accompanying drawings wherein I have used the numeral 1 to designate in its entirety an airfoil sectioned body of a Burnelli lifting body type airplane having outspanned wings 3 extending from opposite sides of the body and a tail group 5 mounted on outriggers or the like 7.

Each outspanned wing structure includes front and rear box wing spars 9 and 11 respectively, the extension or continuation of which form forward and rear main bulkheads 13 and 15, within the airfoil sectioned body 1. It is conventional practice to extend such bulkheads through the body section, however the conventional rear bulkhead 15 is centrally cut away and eliminated to provide a free and unobstructed area or space extending from and between the inner ends 17 of bulkhead 15.

It will be appreciated that the elimination of the usual central portion of the main rear bulkhead 15 will weaken the airplane unless means is provided for taking the various load moments which would normally be handled by a fully transversely extending main rear bulkhead within the airfoil sectioned body of the airplane.

I have provided a system, of what I shall term, torsion boxes which are designed to carry the landing gear loads and the rear wing spar loads which would normally be carried by a fully transversely extending bulkhead, and to carry all other loads to which the airplane may be subjected and which would normally be carried by conventional structure which has been eliminated in the airplane of this invention.

The system of torsion boxes which I have devised includes a major transverse torsion box or section 19 formed of front and rear walls 21 and 23, respectively, and end walls 25. The rear walls 23 include the bulkhead sections 13 of spars 9 and the torsion box is fully transversely extending relative to the airfoil sectioned body 1. The torsion box or section is composed of structural members such as beams, or of any substantially rigid framework structure suitable to carry the loads imposed thereon, all of the adjoining walls being welded, riveted or otherwise secured together to provide a fully integrated section. Reinforcing members 27, may if desired, be used to add strength to the torsion box.

The torsion box system further includes oppositely disposed auxiliary torsion boxes 29 and 31. These auxiliary torsion boxes or sections transmit certain loads to the main transverse torsion box 19 as will be explained hereinafter. The auxiliary torsion boxes 29 and 31 extend rearwardly at opposite ends of the main transverse torsion box and are substantially square in shape. The rear walls of torsion boxes 29 and 31 are formed by the bulkhead sections 15 while the front walls are formed by the sections 13 of the rear walls of the main transverse torsion box 19. End walls 33 are provided and all adjoining walls are fastened together in any suitable manner. Reinforcing members 35 may be used in the auxiliary torsion boxes if found desirable.

Thus, the system of torsion boxes comprises a main fully transversly extending torsion section and two auxiliary torsion sections rearwardly disposed relative thereto and connected therewith for transmitting loads to the main torsion section. As pointed out bulkhead 15 is attached to or may form a continuation of wing spars 11, and bulkhead 13 is attached to or may form a continuation of spars 9, hence all loads are taken by the main transverse torsion box or by the auxiliary torsion boxes for transmission to the main transverse torsion box. The torsion box system includes various integrated structures which carry loads normally carried by the structure within the airfoil sectioned body which has been eliminated to provide space in the body for the cargo container.

The torsion box system is so arranged within the airfoil sectioned body of the airplane that the landing gear loads, for instance, are taken at the points L on the auxiliary torsion boxes for transmission to the main transverse torsion box. The loads of th rear wing spar are similarly carried by this system of torsion boxes as well as all of the main wing loads. The wing stringers carry the drag loads and wing torsion, and this is efficient to accomplish structurally in view of the fact that the upper members of the rear bulkhead (such upper members not being shown in the drawings) carry through directly joining the upper wing beam stringers and skin covering.

A section 37 of the trailing edge of the body of the airplane is movably mounted by a hinge or hinges or any other suitable arrangement, so that such section of the trailing edge may be upwardly lifted as particularly illustrated in Fig. 2 of the drawings to provide a rear opening into the interior of the airplane body.

The structural arrangement hereinbefore outlined and described provides a centrally located area within the body of the airplane forming clearances for receiving the cargo container which I am about to describe. Such centrally located space is defined in the forward portion of the body by the wall or bulkhead 23 of the main torsion box and by the walls 33 of the auxiliary torsion boxes.

The cargo container 39 is intended for the accommodation of cargo freight of any kind, or litter cases, field hospital facilities and the like, or any other equipment or cargo which it is desired to transport as a unit within an airplane. It may also be noted that the container may be used when free of the airplane, as a hut or a substitute for a tent, or as other living quarters for transient field service.

The container 39 is preferably of rectangular section and of dimensions dependent upon the size of the airplane and the space arrangements provided therein. In the instant example, the width of the container is such that it will fit snugly between the walls 33 of the auxiliary torsion boxes, and the length of the container is such that the rear end thereof is adjacent to the trailing edge movable door section 37.

The container is preferably provided with wheels 41 so that it may be pushed or hauled over the ground in the operation of loading the same into the airplane. The wheels 41 are preferably steerable and are provided with sheaves for attachment to cables in order to expedite the positioning of the container within the airfoil sectioned body of the airplane.

Means is provided within the airplane body for hoisting a container therein and for maintaining such container in position within the body of the airplane. This means comprises a motor 45 which may be mounted in any convenient place in the body, the motor being provided with rotating drums 47 for cables 49 which extend over pulley sheaves 51 which are mounted in the airplane. The cables have hooked ends or loops 53 which are adapted to extend over and engage the sheaves on the front wheels of the container. With the container positioned as illustrated in Fig. 2 of the drawings, the hooks on the ends of the cables are placed over the axles or sheaves of the container and the container is drawn into position under the body of the airplane, pulleys 55 being used to draw the container into the position just described. With the container in position under the body of the airplane, the hooked ends or loops 53 of the cables are then removed from the front wheels of the container, and the cables are removed from pulleys 55 and the cable on each side of the container is drawn beneath the front axle and the rear axle of the container and each cable by means of the hooks on the end thereof is attached to a hook or the like 57, in fixed position within the airplane, so that when the motor is operated the length of the cable will shorten and the container will be lifted vertically into position within the body as illustrated in dotted lines in all of the figures of the drawings. The cables will be maintained in this position supporting the weight of the container while the airplane is in flight.

The floor 59 of the airfoil sectioned body may be provided with any suitable type doors which may be opened for admitting the container 39. Such doors may be of the sliding type or of the swinging type. Before the container 39 is moved into position directly below pulleys 51 and 57 for hoisting to its final position, the doors of floor 59 are, of course, opened and moved clear of the space into which the container is moved.

With the container 39 positioned within a Burnelli lifting body type airplane, it will be appreciated that the centrally disposed container will occupy about 50% of the available area leaving ample space on opposite sides of the cabin section for transport of troops, passengers or special cargo. This space advantage, inherent in the Burnelli type of plane design, makes it practical to transport military field supplies adequate for the maintenance of the large number of personnel carried in the side sections.

I claim:

1. An airplane having an airfoil sectioned body and wings extending from opposite sides thereof, including wing spars, said body having an unobstructed centrally arranged area therein, and means for carrying loads transversely through the body including a substantially rigid main torsion box extending transversely of the body forward of the unobstructed central area, and a pair of transversely spaced auxiliary torsion boxes connected to said main torsion box and extending rearwardly from said main torsion box adjacent the ends thereof and at each side of the central unobstructed area, the auxiliary torsion boxes connected to the wing spars for transmitting loads therefrom to said main torsion box.

2. An airplane having an airfoil sectioned body and wings extending from opposite sides thereof, including wing spars, said body having an unobstructed centrally arranged area therein, and means for carrying loads transversely through the body and around the central unobstructed area, including a substantially rectangular and rigid box-like framework extending from one side of the body to the opposite side of the body forward of the central unobstructed area, and a pair of substantially rectangular and rigid transversely spaced box-like frames of less transverse dimensions than said first mentioned framework and connected thereto and extending rearwardly therefrom at each side of the central unobstructed area, said pair of frames connected to the wing spars for transmitting loads to said first mentioned box-like framework.

3. An airplane having an airfoil sectioned body and wings extending from opposite sides thereof, a rear wing spar in each wing, a stub bulkhead connected to the inner end of each spar and extending inwardly a distance into the body, the stub bulkheads being disconnected within the vertical plane thereof providing a clearance therebetween, and load carrying structural members mounted in the body and extending transversely thereof and displaced relative to the vertical plane of the bulkheads and further load carrying structural members connected to said first named structural members and said stub bulkheads for transmitting loads to said first named structural members.

4. An airplane having an airfoil sectioned body and wings extending from opposite sides thereof, including wing spars, said body having an unobstructed centrally arranged area therein, and means for carrying loads transversely through the body and around the central unobstructed area, including a substantially rectangular and rigid box-like framework extending from one side of the body to the opposite side thereof forward of the central unobstructed area, and load carrying means connected to said box-like framework and extending rearwardly therefrom at each side of the central unobstructed area, said means connected to the wing spars for transmitting loads to said box-like framework.

5. In combination, an airplane having an airfoil sectioned body and wings extending from opposite sides thereof, including wing spars, said body having an unobstructed centrally arranged and longitudinally extending area therein adapted to receive a cargo container and adapted to be closed at the bottom of the area by air excluding non-supporting closure members, a substantially rigid torsion box extending transversely of the body forward of the unobstructed area, and associated with the wing spars for carrying main wing, landing gear and other loads, a section of the trailing edge of the body in line with the unobstructed area swingably mounted providing an opening into the central unobstructed area, and a cargo container carried in the unobstructed area within the fuselage, and hoisting and suspending means mounted within the body for vertically hoisting the cargo container into the body and for maintaining the cargo container in suspended position within the body.

VINCENT J. BURNELLI.

REFERENCES CITED

The following references are of record in the file of this patent:

UNITED STATES PATENTS

| Number | Name | Date |
|---|---|---|
| 1,516,295 | Huntington | Nov. 18, 1924 |
| 1,860,076 | Callison | May 24, 1932 |
| 2,268,009 | Babb et al. | Dec. 30, 1941 |
| 2,281,673 | Burnelli | May 5, 1942 |
| 2,315,117 | Freytag | Mar. 30, 1943 |
| 2,323,279 | Van Zelm | June 29, 1943 |
| 2,415,975 | Thomson | Feb. 18, 1947 |
| 2,425,499 | Watter | Aug. 12, 1947 |